United States Patent [19]

Farah et al.

[11] Patent Number: 4,648,054

[45] Date of Patent: Mar. 3, 1987

[54] CONTINUOUS MEASUREMENT OF YARN DIAMETER AND TWIST

[75] Inventors: Boshra D. Farah, Kogarah; Jae L. Woo, Eastwood, both of Australia

[73] Assignee: Unisearch Limited, Australia

[21] Appl. No.: 622,478

[22] Filed: Jun. 20, 1984

[30] Foreign Application Priority Data

Jun. 20, 1983 [AU] Australia ............................... PF9890

[51] Int. Cl.⁴ ...................... G01H 17/00; G06F 15/46
[52] U.S. Cl. ...................................... 364/552; 57/264; 73/160; 73/264; 364/470
[58] Field of Search ............... 364/552, 554, 470, 563; 57/81, 264, 265, 362; 73/159, 160, 651

[56] References Cited

U.S. PATENT DOCUMENTS

| | | | |
|---|---|---|---|
| 3,945,181 | 3/1976 | Yamazaki et al. | 73/160 |
| 4,000,641 | 1/1977 | Lewis | 73/160 |
| 4,045,659 | 8/1977 | Akagawa et al. | 364/470 |
| 4,148,178 | 4/1979 | Rashele | 57/264 |
| 4,168,604 | 9/1979 | Mannhart | 57/264 |
| 4,430,720 | 2/1984 | Aemmer | 364/522 |
| 4,506,339 | 3/1985 | Kühnlein | 364/565 |

Primary Examiner—Parshotam S. Lall
Assistant Examiner—H. R. Herndon
Attorney, Agent, or Firm—Bacon & Thomas

[57] ABSTRACT

A yarn twist measurement device having a freely rotatable disc with its axis parallel to the axis of a travelling yarn. The disc being rotated by the surface twist of the yarn in contact with the circumference of the disc as the yarn travels past the disc. By measuring the circumferential displacement of the disc and the corresponding linear translation of the yarn, the amount of twist on the surface of the yarn can be calculated.

19 Claims, 6 Drawing Figures

CONTINUOUS MEASUREMENT OF YARN DIAMETER AND TWIST

The present invention relates to a method and means for continuous measurement of surface twist angle in a travelling length of yarn which in association with a corresponding continuous measurement of yarn diameter enables continuous measurement of yarn twist which is a simplified measure of quality control in yarn manufacturing or research and development processes. In another aspect, the present invention is concerned with a method and apparatus for measuring the changes in diameter of a travelling yarn.

The majority of the existing or known devices and methods rely on either destructive tests or the measurement of twist-angle alone and ignore the important fact that the twist being measured is invariably dependent on the ever-varying yarn diameter. No existing device is known to be capable of measuring the twist of non-rotating translating yarn specially at high speeds.

Toray Industries, Inc. of Japan, has developed a twist Monitor. That device cannot measure the twist of a running yarn when it does not rotate. This means that the Toray device cannot be used once the yarn leaves the actual twist-insertion stage of a manufacturing process and cannot measure the twist of yarns taken from a package.

Our co-pending U.S. patent application Ser. No. 606774 entitled "Continuous Measurement of Yarn Twist", now U.S. Pat. No. 4,584,875, discloses a method and means for non-destructive measuring of the amount of twist in a travelling length of yarn and its disclosure is incorporated herein by reference. The method and apparatus of U.S. Pat. No. 4,584,875 has been found suitable for measuring twist in yarns travelling at relatively low to moderate speeds whereas the present invention is suitable for yarns travelling at much greater speeds.

In the present invention the surface twist angle of a travelling yarn is measured by a freely rotatable circular disc which contacts the travelling yarn and has its axis of rotation substantially parallel to the yarn axis at its point of contact with the yarn. In this way the twist angle "$\alpha$" or rather "$\tan \alpha$", in the ideal case, is directly proportional to the ratio of the circumferential displacement of the disc to the corresponding linear displacement of the yarn past the disc. In the practical case "$\tan \alpha$" follows a certain function of the aforementioned ratio as will be explained later.

Twist "T", in terms of the number of turns per unit length, is dependent on the yarn diameter "d" and "$\tan \alpha$"; i.e. "$T = (\tan \alpha)/(\pi d)$" where "$\alpha$" is the surface twist angle. Nondestructive, continuous measurement of twist in moving single yarn is effected by simultaneously sensing "$\tan \alpha$" and "d". "$\tan \alpha$" is measured by sensing the circumferential displacements of two freely rotating discs with axes perpendicular to each other, being in contact with the moving yarn in such a way that one of the axes is parallel to the yarn axis.

The value of "$\tan \alpha$" is determined by a function of the ratio between the displacements of the disc with the parallel axis to the displacement of the other one.

In the other aspect the diameter of the travelling yarn is measured directly by recording changes in output of a photo cell as the magnitude of the shadow cast thereon by an illuminated yarn, travelling past the cell, varies in relation to changes in diameter of that yarn.

Yarn diameter "d" is, preferably, measured by using photoelectric cells in combination with capacitance heads by comparing the moving yarn diameter relative to that of a fixed control yarn having the nominal diameter.

The present invention will now be described by way of example with reference to the accompanying drawings, in which:

FIG. 1 is a schematic representation of a preferred apparatus in accordance with the invention;

FIG. 1-A is a close-up view of the contact between the disc 3 and the travelling yarn 1 demonstrating the mathematics which determine the measurement of "$\tan \alpha$" for an ideal disc/yarn motion;

FIG. 1-B demonstrates the force analysis in practical disc/yarn motion, where the measuring index "$I_d$" is a function of twist angle "$\alpha$" and therefor of "$\tan \alpha$";

Figure 1:
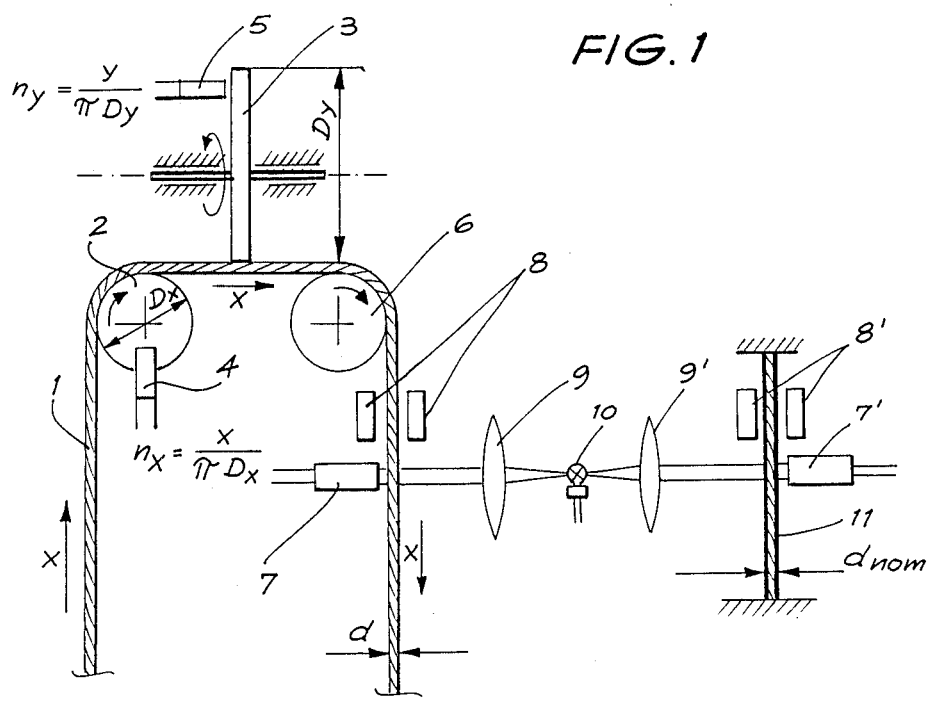
Figure 2:
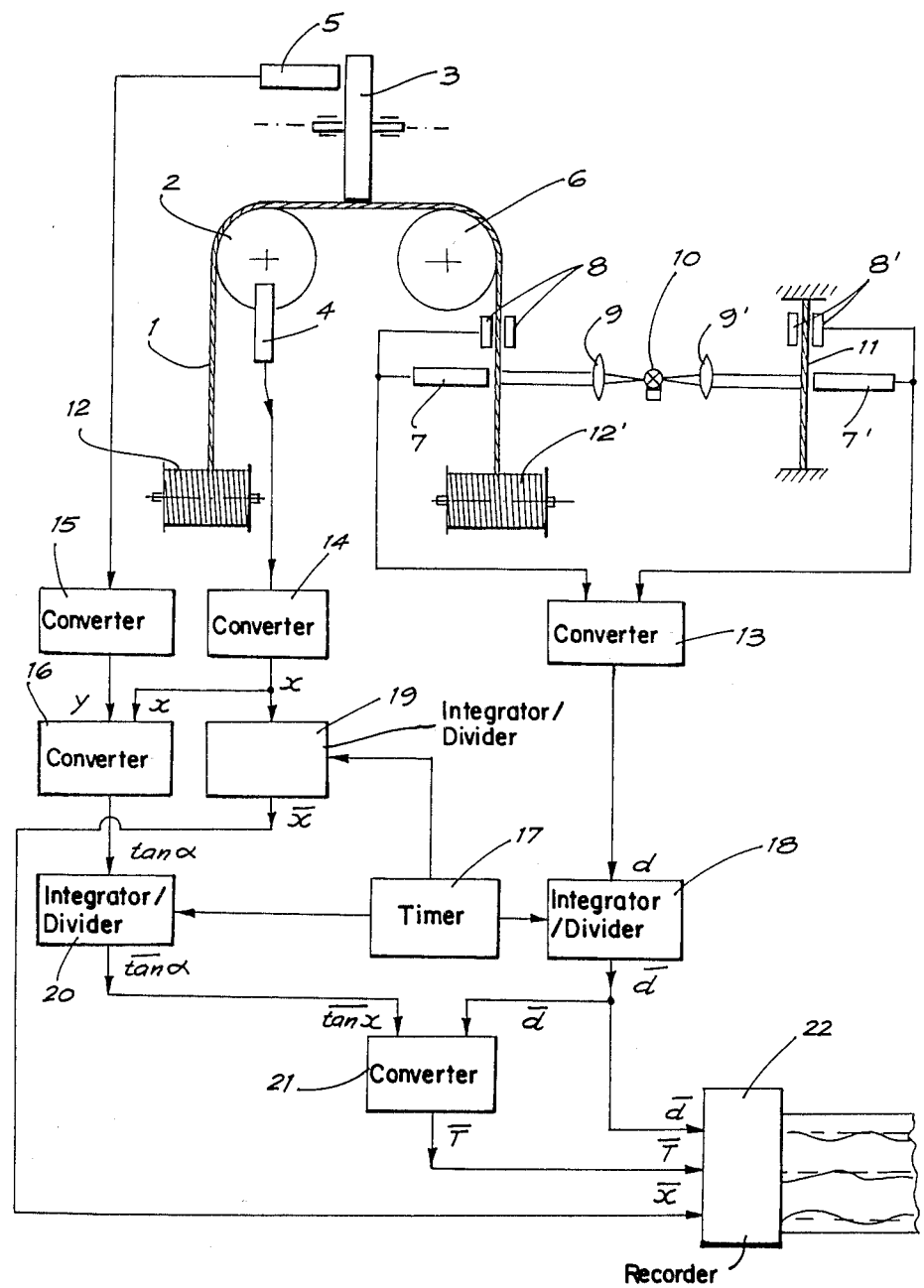
FIG. 2 is a schematic representation of the apparatus of FIG. 1 employed as a measuring instrument.
Figure 3:
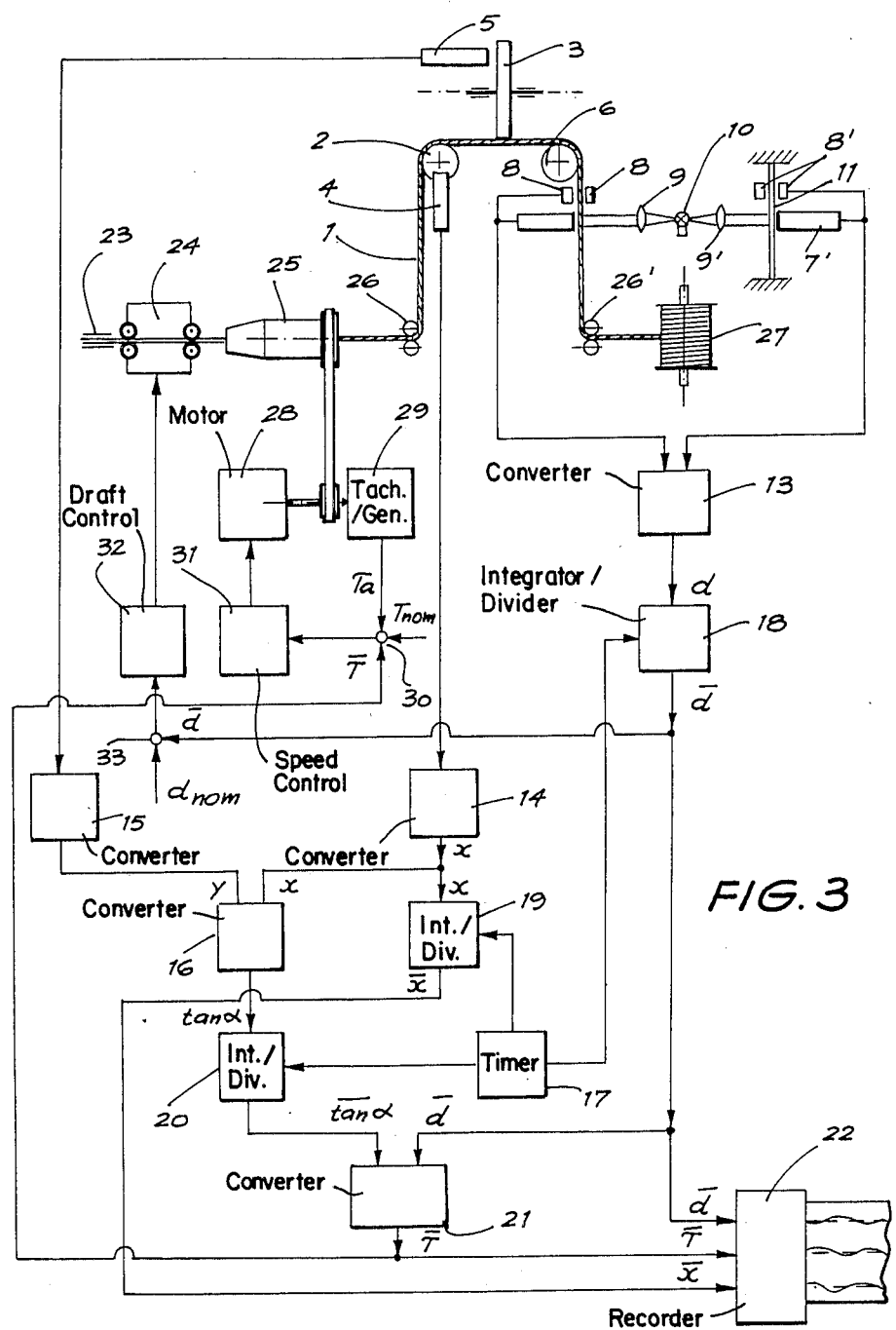
FIG. 3 is a schematic representation of the apparatus of FIG. 1 with a feedback controlling drafting and twist insertion systems as employed in a yarn manufacturing process.

Referring to the drawings and in particular FIG. 1 and its counterparts in FIGS. 2 and 3 there is shown a travelling yarn 1 passing around the circumference of a disc 2 with its axis perpendicular to that of yarn 1. A freely rotatable disc 3 has its circumference in contact with yarn 1 and its axis parallel to the yarn axis at its point of contact with the yarn 1.

Yarn 1 travels in the direction "X" and around a guide roll 6 after contacting disc 3 and passes between either capacitance heads 8 or past photoelectric cell 7 or both which separately produce signals proportional to the diameter of travelling yarn 1. In the case of the photoelectric cell 7 it receives an incident beam from light source 10 via lens 9 which is shaded by yarn 1 as it travels past cell 7 providing a continuous measure of diameter "d" of yarn 1. A reference nominal diameter "$d_{nom}$", is provided by cell 7' as well as by capacitance head 8' located in similar manner relative to a fixed nominal yarn 11 which can be compared with the signals from cell 7 and capacitance head 8, respectively, to provide an instantaneous measure of actual diameter "d" of yarn 1.

Figure 1A:
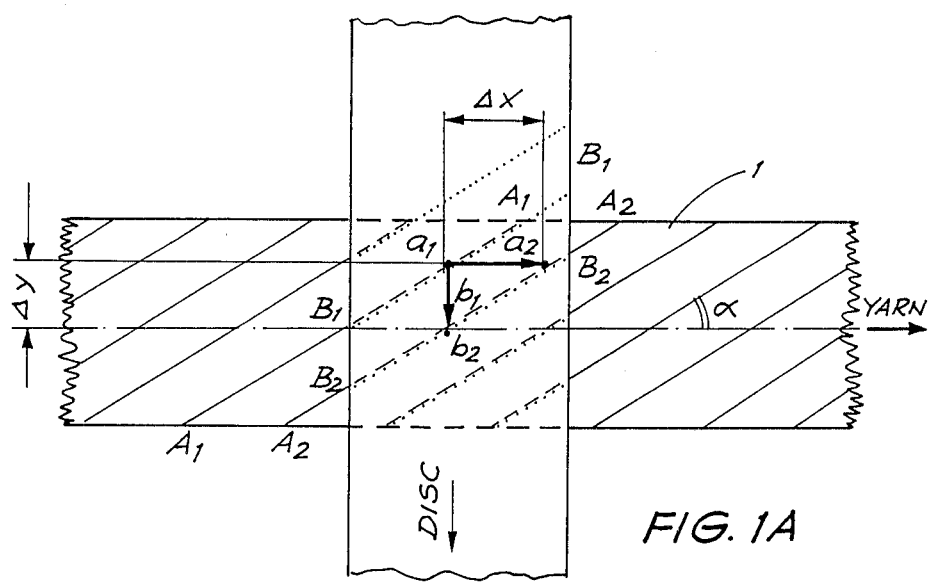
Figure 1B:
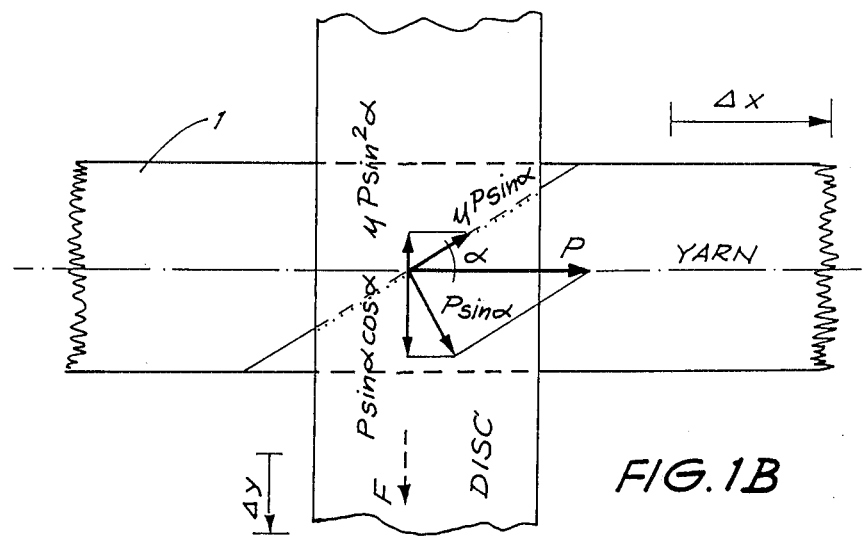

Referring to FIGS. 1A and 1B which show yarn 1 with a surface twist angle "$\alpha$". Disc 3 with axis parallel to yarn 1 being in contact with yarn 1 which is travelling in non-rotating manner in direction "X". In the case of ideal disc/yarn motion (FIG. 1-A) a point of contact "$a_1/b_1$" between the yarn 1 and the disc 3 will impart a circumferential translation "$\Delta y$" to disc 3 while yarn 1 has travelled a distance "$\Delta X$" such that "$\tan \alpha = (-\Delta y)/(\Delta x)$".

As the translation "$\Delta y$" and "$\Delta X$" occur in the same time interval "$\Delta t$" then if the speed of travel of yarn 1 is known "$(\Delta x)/(\Delta t)$" and the speed of travel of the circumference of disc 3 is known "$(\Delta y)/(\Delta t)$" then $$\text{"}\tan \alpha = \frac{\Delta y}{\Delta t} \times \frac{1}{\frac{\Delta x}{\Delta t}} = \frac{\Delta y}{\Delta x} = I_d\text{"}.$$

More particularly, referring to FIG. 1-B, in the real world case the measuring index "$I_d$" is actually a function of "tan α" and can be shown to be "$I_d = K_1 (\sin 2\alpha - K_2 \sin^2 \alpha)$" where "$K_1$" and "$K_2$" are constants.

As seen in FIG. 2 the speed of travel of yarn 1 is measured by sensing the speed of rotation of disc 2 via sensing element 4 (e.g. an opto coupler or shaft encoder) and the speed of rotation of disc 3 is measured by a similar sensing element 5.

The rotational speed signals produced by sensing elements 4, 5 are converted in converters 14, 15, respectively, to produce signal "X", being the longitudinal displacement of yarn 1, and a signal "y", being the circumferential displacement of disc 3. Converter 16 produces an output of "tan α" and an integrator/divider 19 produces an output "$\overline{X}$" being the average value of "X" over a predetermined time period as determined by timer 17, i.e. longitudinal yarn speed. Integrator/divider 20 produces an output corresponding to the average value "tan α" over the same time period as determined by timer 17.

Converter 21 producing an output signal corresponding to average twist "$\overline{T}$" of yarn 1 over the time period determined by timer 17 which is displayed as one output of multi pen recorder 22.

The instantaneous measure of diameter "d" of yarn 1 is averaged over the time period specified by timer 17 in integrator/divider 18 which outputs an average diameter "$\overline{d}$" for that time period to converter 21 and pen recorder 22. It can be seen, therefore, that pen recorder 22 provides a continuous log of average diameter "$\overline{d}$", average twist "$\overline{T}$" and average yarn speed "$\overline{X}$".

In FIG. 3 not only are "$\overline{d}$", "$\overline{T}$" and "$\overline{X}$" recorded but there are also provided feedback controls for yarn diameter and twist in the manufacture of yarn 1 which is produced by supplying input material, e.g. sliver, roving or tops, to drafting system 24, e.g. roller or opening roller system.

The formed yarn leaves drafting system 24 and passes through a twist insertion device 25, such as an open-end spinning rotor, then around nip rollers 26 before passing through apparatus of the type shown in FIG. 1 then around nip rollers 26' and onto take up winding head 27.

The feedback control for yarn diameter is provided by comparator 33 which compares "$\overline{d}$" and "$d_{nom}$", providing a control signal to variable drafting device which controls drafting system 24 to increase or decrease the yarn diameter in dependance upon whether "$\overline{d} < d_{nom}$" or "$\overline{d} > d_{nom}$", respectively.

The control loop for controlling the twist insertion device 25 comprises a comparator 30 comparing nominal twist value "$T_{nom}$" measured, average twist value "$\overline{T}$" and the twist value "Ta", equivalent to the rotation of the device 25, as measured by tachogenerator 29. The output from comparator 30 controls a variable speed device 31 which adjusts the speed of motor 28 driving the device 25.

Figure 4:
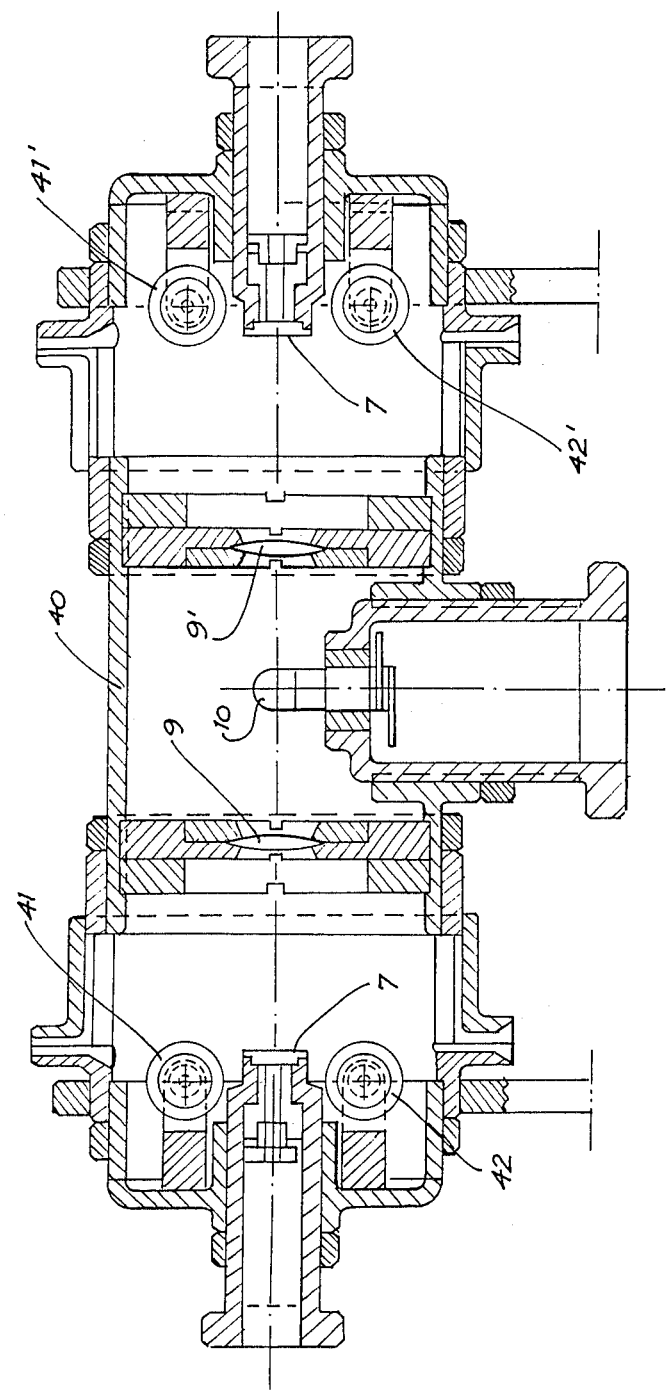
FIG. 4 is a sectional view of one embodiment of apparatus for sensing yarn diameter in the system of FIG. 1.

FIG. 4 is a sectional view of yarn diameter measuring apparatus of the type employed in FIGS. 1, 2 and 3 and comprises a housing 40 containing a light source 10, lenses 9, 9' and photoelectric cells 7, 7'. In operation a length of reference diameter yarn is clamped in one side, say the right hand side, between a pair of guide rollers 41', 42'. Between the other pair of guide rollers 41, 42 the yarn 1 is fed so as to cast a varying shadow onto photoelectric cell 7 in dependence upon changes in diameter of yarn 1 throughout its length as it passes cell 7.

In this case there is shown a novel method and apparatus for measurement of yarn diameter as well as its longitudinal density utilizing a combined system of photoelectric cells and capacitance heads. This new technique is distinct from the known photoelectric or capacitance techniques. It provides continuous measurement of diameter and longitudinal density of the running yarn 1 in comparison with (or relative to) a reference yarn 11 (control specimen). Furthermore, it provides direct measurement of the actual yarn diameter "d", using photoelectric cells 7, 7', which is an essential parameter in determination of yarn twist "T". Simultaneously it provides measurement of yarn longitudinal density, using capacitance heads 8, 8', which is an essential parameter in the control of a drafting system for the production of an even yarn.

The substantial advantages of employing the method and apparatus in accordance with this invention will be readily appreciated and include:

(1) The capability of non-destructive, continuous measurements of diameter and twist in a non-rotating, translating yarn, i.e. measurement of twist after its complete insertion or of a yarn taken directly from a package.
(2) Precise measurement of the actual yarn twist, since twist angle and yarn diameter are measured simultaneously.
(3) The capability of measuring twists in single yarns, whether they are continuous filament or staple-fibre yarns.
(4) Monitoring of drafting systems and twist insertion process in high production spinning machines.

It will be appreciated that the present invention is not limited by the specifics of the preceding description in relation to the drawings and the addressee will be aware of variations and modifications once apprised of the essential elements of this invention.

It will be recognised by the addressee that numerous variations and modifications may be made to the invention as described above without departing from the spirit or scope of the invention as broadly described.

We claim:

1. A method of determining the surface twist angle of a translating yarn comprising, during a predetermined period of time, measuring the displacement of a circumference of a freely rotatable circular disc in contact with the translating yarn, said disc being oriented with its axis parallel to the axis of the yarn at the point of contact between the yarn the disc, measuring the linear translation of the yarn past the disc and calculating the surface twist angle of the yarn from the ratio between the two measurements.

2. A method as claimed in claim 1 wherein the linear translation of the yarn is determined by measuring the circumferential displacement of a further disc over which the translating yarn travels.

3. A method as claimed in claim 1 wherein the linear translation of the yarn is determined by measuring the circumferential displacement of a guide roller over which the translating yarn travels.

4. Apparatus for measuring the surface twist angle of a travelling yarn comprising means for measuring the linear translation of the yarn, and means for measuring a displacement of the circumference of a freely rotatable circular disc mounted to be in contact with the travelling yarn, and having its axis of rotation substantially parallel to the axis of the yarn at the point of contact between the circumference of the disc and the yarn, such that the motion of the yarn surface imparts rotational force to the disc whereby the displacement of the circumference of the disc relative to the translation of the yarn corresponds to said surface twist angle.

5. Apparatus as claimed in claim 4 wherein the means for measuring the translation of the yarn comprises a further circular disc around a circumferential portion of which the yarn travels so as to rotate said further disc, and means for measuring the displacement of the circumference of said further disc.

6. Apparatus as claimed in claim 5 wherein the respective means for measuring the displacement of the circumference of each of said discs comprises a rotational speed sensing element.

7. Apparatus as claimed in claim 6 wherein each rotational speed sensing element comprises an opto coupler and reflectors.

8. Apparatus as claimed in claim 6 wherein each rotational speed sensing element comprises a shaft encoder.

9. Apparatus as claimed in claim 4 wherein the means for measuring the translation of the yarn comprises a further roller around a circumferential portion of which the yarn travels so as to rotate said roller, and means for measuring the displacement of the circumference of said roller.

10. Apparatus as claimed in claim 9 wherein the means for measuring the respective displacements of the circumferences of said disc and said roller each comprise a rotational speed sensing element.

11. Apparatus as claimed in claim 10 wherein each rotational speed sensing element comprises an opto coupler and reflectors.

12. Apparatus as claimed in claim 10 wherein each rotational speed sensing element comprises a shaft encoder.

13. A system for measuring surface twist angle and diameter of a travelling yarn comprising means for measuring the linear translation of the yarn, and means for measuring the displacement of a circumference of a freely rotatable circular disc mounted to be in contact with the travelling yarn, and having its axis of rotation substantially parallel to the axis of the yarn at the point of contact between the circumference of the disc and the yarn, such that the motion of the yarn surface imparts rotational force to the disc whereby the displacement of the circumference of the disc relative to the translation of the yarn corresponds to said surface twist angle, and photoelectric means and a light source positioned on opposite sides of the travelling yarn such that the output of the photoelectric means varies in accordance with changes in diameter of the yarn and, a further light source and further photoelectric means with a reference yarn therebetween such that the output of said further photoelectric means corresponds to the diameter of the reference yarn, and means for comparing the outputs of said photoelectric means as a measure of the relative diameters of said travelling and reference yarns.

14. A system as claimed in claim 13 in combination with yarn drafting means and twist insertion means wherein yarn formed by the drafting and twist insertion means passes through said system for measuring surface twist angle and diameter to calculate yarn twist and linear density, and wherein feedback control means are provided to regulate the diameter and linear density of the yarn from the drafting means and the twist imparted to the yarn by the twist insertion means so as to maintain the twist and linear density of the output yarn within predetermined limits.

15. A system as claimed in claim 13 comprising means for measuring the linear density of the travelling yarn relative to the linear density of the reference yarn comprising a capacitance head with one of each of its opposite poles positioned on opposite sides of the travelling yarn and a second capacitance head, with one of each its opposite poles positioned on opposite sides of the reference yarn such that a comparison of the outputs of each of said first and second heads provides a measure of the relative linear densities of the travelling and reference yarns.

16. A system as claimed in claim 13 wherein the yarn twist is calculated in accordance with the formula: $T = (\tan \alpha)/(\pi d)$ where $T$ = twist in turns per unit length; $\alpha$ = surface twist angle; and $d$ = yarn diameter.

17. A system as claimed in claim 16 comprising means for measuring the linear density of the travelling yarn relative to the linear density of the reference yarn comprising a capacitance head with one of each of its opposite poles positioned on opposite sides of the travelling yarn and a second capacitance head, with one of each of its opposite poles positioned on opposite sides of the reference yarn such that a comparison of the outputs of each of said first and second heads provides a measure of the relative linear densities of the travelling and reference yarns.

18. A system as claimed in claim 17 in combination with yarn drafting means and twist insertion means wherein yarn formed by the drafting and twist insertion means passes through said system for measuring surface twist angle and diameter to calculate yarn twist and linear density, and wherein feedback control means are provided to regulate the twist imparted to the yarn by the twist insertion means and the diameter and linear density of the yarn from the drafting means, respectively, so as to maintain the twist and linear density of the output yarn within predetermined limits.

19. Apparatus for measuring the diameter of a travelling yarn relative to the diameter of a reference yarn comprising photoelectric means and a light source positioned on opposite sides of the travelling yarn such that the output of the photoelectric means varies in accordance with changes in diameter of the travelling yarn and, further photoelectric means with the reference yarn between said light source and said further photoelectric means such that the output of said further photoelectric means corresponds to the diameter of the reference yarn, and means for comparing the outputs of said photoelectric means as a measure of the relative diameters of said travelling and reference yarns.

* * * * *